(12) United States Patent
Swartling et al.

(10) Patent No.: US 8,862,345 B2
(45) Date of Patent: Oct. 14, 2014

(54) DOUBLE GEARCHANGE PREVENTION

(75) Inventors: Fredrik Swartling, Södertälje (SE); Mikael Öun, Norsborg (SE)

(73) Assignee: Scania CV AB (SE)

( * ) Notice: Subject to any disclaimer, the term of this patent is extended or adjusted under 35 U.S.C. 154(b) by 435 days.

(21) Appl. No.: 13/391,917

(22) PCT Filed: Sep. 10, 2010

(86) PCT No.: PCT/SE2010/050962
§ 371 (c)(1),
(2), (4) Date: Feb. 23, 2012

(87) PCT Pub. No.: WO2011/031220
PCT Pub. Date: Mar. 17, 2011

(65) Prior Publication Data
US 2012/0158259 A1      Jun. 21, 2012

(30) Foreign Application Priority Data

Sep. 14, 2009   (SE) ...................... 0950657

(51) Int. Cl.
| | |
|---|---|
| *F16H 61/16* | (2006.01) |
| *F16H 61/18* | (2006.01) |
| *F16H 61/08* | (2006.01) |
| *F16H 59/02* | (2006.01) |
| *F16H 59/00* | (2006.01) |

(52) U.S. Cl.
CPC ............... *F16H 61/18* (2013.01); *F16H 61/08* (2013.01); *F16H 2059/0239* (2013.01); *F16H 61/16* (2013.01); *F16H 2059/006* (2013.01)
USPC ........................................................ 701/52

(58) Field of Classification Search
USPC ............. 74/473.18, 473.21; 475/131; 701/66, 701/62, 52, 58, 59, 60
See application file for complete search history.

(56) References Cited

U.S. PATENT DOCUMENTS

| | | | |
|---|---|---|---|
| 5,868,033 A | 2/1999 | Nishino et al. | 74/335 R |
| 5,908,369 A | 6/1999 | Nakauchi et al. | 477/125 |
| 2009/0222181 A1 | 9/2009 | Lindgreen | 701/64 |

FOREIGN PATENT DOCUMENTS

| | | |
|---|---|---|
| CN | 1587756 A | 3/2005 |
| CN | 101263324 A | 9/2008 |

(Continued)

OTHER PUBLICATIONS

Chinese Office Action, dated Feb. 8, 2014, issued in corresponding Chinese Patent Application No. 2010800406123. English translation. Total 9 pages.

(Continued)

*Primary Examiner* — Khoi Tran
*Assistant Examiner* — Adam Mott
(74) *Attorney, Agent, or Firm* — Ostrolenk Faber LLP

(57) ABSTRACT

A method for prevention of unwanted double gear changes for a gearbox in a motor vehicle. The vehicle comprises an engine connected to drive the gearbox. The gearbox also effects a manual gear change in an automatic mode if a mode selector connected to the gearbox is activated. The manual gear change is barred if the mode selector is only activated a first time during a gear change period, which represents a period of time during which an automatic gear change is effected in the automatic mode. A system, a computer program, a computer program product and a motor vehicle, which prevent an unwanted double gear change, are disclosed.

12 Claims, 2 Drawing Sheets

(56) References Cited

FOREIGN PATENT DOCUMENTS

| DE | 197 09 506 A1 | 11/1997 |
| DE | 197 49 132 A1 | 5/1998 |
| DE | 10 2008 000 532 A1 | 9/2008 |
| EP | 1 298 361 | 4/2003 |
| GB | 2 418 711 | 4/2006 |
| JP | 9-257125 | 9/1997 |
| WO | WO 02/097308 A1 | 12/2002 |
| WO | WO 03/081089 | 10/2003 |

OTHER PUBLICATIONS

International Search Report mailed Dec. 14, 2010 in corresponding PCT International Application No. PCT/SE2010/050962.

Supplementary Search Report dated May 22, 2013 issued in corresponding European Patent Application No. 10815703.3.

DOUBLE GEARCHANGE PREVENTION

CROSS-REFERENCE TO RELATED APPLICATIONS

The present application is a 35 U.S.C. §§371 national phase conversion of PCT/SE2010/050962, filed Sep. 10, 2010, which claims priority of Swedish Application No. 0950657-7, filed Sep. 14, 2009, the contents of which are incorporated by reference herein. The PCT International Application was published in the English language.

TECHNICAL FIELD

The present invention relates to a method for prevention of unwanted double gear changes in a gearbox of a motor vehicle. The present invention relates also to a system for prevention of unwanted double gear changes, a motor vehicle comprising the system according to the invention, and a computer program and a computer program product which implement the method according to the invention.

BACKGROUND TO THE INVENTION

FIG. 1 depicts schematically parts of a power train for a motor vehicle 1, such as a passenger car or a heavy vehicle, e.g. a truck or bus. The power train comprises an engine 10 mechanically connected by a shaft to a first end of a gearbox 20 via a clutch device 40. The gearbox 20 is also mechanically connected, at its other end, by a propeller shaft 50 to a differential gear 30 associated with a rear axle. The rear axle comprises respective left and right drive shafts 60 which drive the vehicle's powered wheels (not depicted in the diagram).

With this well-known arrangement, the mechanical work of the engine 10 is transmitted via various transmission devices, e.g. the clutch device 40, the gearbox 20, the propeller shaft 50, the differential gear 30 and the drive shafts 60, to powered wheels in order to move the vehicle 1. An important device in the power train is the gearbox 20, which has a number of forward gears for moving the vehicle 1 forwards, and usually also one or more reverse gears. The number of forward gears varies but modern kinds of trucks are usually provided with twelve forward gears.

The gearbox 20 may be of manual or automatic type (automatic gearbox), but also of the automatic manual gearbox type (automatic manual transmission, AMT).

Automatic gearboxes and automatic manual gearboxes are automated gearbox systems usually controlled by a control unit 110 (sometimes also called electronic control unit, ECU) which is adapted to controlling the gearbox 20, e.g. during gear changing, as when choosing appropriate gears at a certain vehicle speed with a certain running resistance. The ECU may measure engine speed and the state of the gearbox 20 and control the gearbox by means of solenoid valves connected to compressed air devices. Information about the engine 10, e.g. its speed and torque, is also sent from the engine 10 to the ECU, e.g. via a CAN (controller area network) bus.

The control unit 110 further comprises devices for receiving information, e.g. in the form of input signals, from the gearbox 20 via a connection 80 and/or from, for example, one or more input units 120 via a connection 90. The control unit further comprises devices for delivering information, e.g. in the form of control signals, to the gearbox 20 via a connection 70 and/or to one or more output units 130 via a connection 100. The control unit may be situated close to the driving cab or close to the gearbox or substantially anywhere in the vehicle 1. Input units 120 and/or output units 130 are with advantage so situated that they are reachable and/or viewable by a driver of the vehicle.

In conventional gear change systems, the control unit 110 uses tabulated engine speed limits when choosing appropriate gears. These engine speed limits are also called shift points and they represent the engine speed at which a downshift or upshift should be effected in the gearbox 20. This means that the vehicle 1 changes gear when the speed of its engine 10 passes a speed represented by a shift point. The shift points are therefore to be construed as providing information not only about when a downshift or upshift should take place but also about the number of gear steps to be effected at each downshift or upshift. It is usual for each shift point to comprise one to three gear steps, but more steps are possible, e.g. one to six.

In certain systems for automated gearboxes, e.g. a system such as referred to in U.S. Pat. No. 5,908,369, a driver can manually choose appropriate gears after having switched the automated gearbox over to manual mode. In that system, the gear lever and the system are so configured that the driver has to switch to manual mode in order to be able to change gear manually, which he/she may find burdensome. In manual mode, the system uses a number of timers to keep track of whether manual gear changing may be effected or not.

There are also certain systems for automated gearboxes in which a driver in automatic mode may be enabled to change gear up or down manually if he/she is not satisfied with the gear choice made in automatic mode. Such manual gear changing is then effected if an input unit 120, here in the form of a mode selector, e.g. a paddle, is activated by a driver of the vehicle, whereupon a manual gear change is imposed.

Such imposed manual gear changing may cause problems in certain situations. If for example the driver imposes a manual gear change near in time to an automatic gear change effected by the automated gearbox, the manual gear change initiated and imposed by him/her risks being added to the automatic gear change. If this happens, the vehicle will change gear up or down more than the driver intended and also more than the automatic shift was intended to do. In other words, the result is an unwanted double gear change which will greatly affect the engine's speed and may cause it to stall.

BRIEF DESCRIPTION OF THE INVENTION

An object of the present invention is to propose a method and a system for prevention of unwanted double gear changes which totally or partly solve the above problem.

This object is achieved by a method and a system for prevention of unwanted double gear changes.

The object is also achieved by a motor vehicle comprising the system according to the invention and by a computer program and a computer program product which implement the method according to the invention.

The method and the system for prevention of unwanted double gear changes according to the present invention provide effective protection against unwanted double gear changes and hence against undesirable engine stalling due to incorrect gear changing. The perception of a driver of the vehicle will be that the system is very easy to use and gives the impression that the driver him/herself controls how gear changing is effected.

The present invention may also be implemented with very little additional complexity in the vehicle, since the method can use circuits and cables already installed in modern vehicles and involves a very limited amount of the control unit's computing power.

According to an embodiment of the present invention, a driver can effect a desired manual gear change by repeatedly activating the mode selector during a gear change period. This embodiment affords an advantage in that a skilful driver can reduce inter alia fuel consumption and vehicle wear while at the same time having a feeling of being in control of gear changing.

According to an embodiment of the present invention, gears chosen are displayed by a gear indicator if the mode selector is activated at least once during a gear change period. This embodiment affords an advantage in that the driver is led to believe that it is specifically his/her activation of the mode selector which results in a gear change, even if what actually takes place is an automatic gear change. This embodiment also gives the driver enhanced driving sensation.

BRIEF DESCRIPTION OF THE DRAWINGS

The invention is explained below in more detail with reference to the attached drawings, in which the same reference notations are used for similar items, and in which.

DESCRIPTION OF PREFERRED EMBODIMENTS

Figure 1:
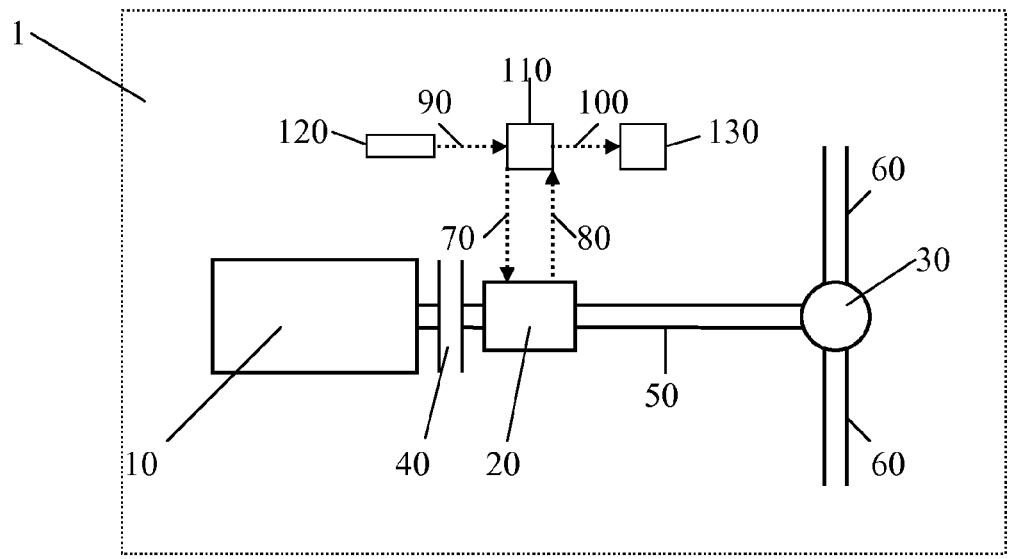
FIG. 1 depicts schematically a power train for a motor vehicle.

The present invention relates to a method and a system for prevention of unwanted double gear changes in a motor vehicle, whereby the vehicle's gearbox is adapted to being able to effect a manual gear change, i.e. an imposed manual gear change, in automatic mode. What normally takes place in automatic mode is automatic gear changes, but here the driver can even in automatic mode compel the system to effect manual gear changes.

The driver being able to impose manual gear changes when the system is in automatic mode affords advantages in that an experienced driver familiar with the way his/her vehicle behaves in different situations can thereby not only achieve greater comfort but also reduce fuel consumption, environmentally harmful emissions and vehicle wear.

However, the ability to impose manual gear changes on the system may also cause problems in certain situations. An example of a situation where an imposed manual gear change may be problematical is where the vehicle 1 is travelling uphill and needs to slightly raise the engine speed if it is to do so, particularly if the vehicle is heavy. In automatic mode, automatic gearboxes often have certain safety margins before upward gear changes, in order to avoid the incorrect procedure of first changing up and then having to change back down again in order to cope with the climb. In other words, in automatic mode these built-in safety margins may result in the engine speed rising to a relatively high level before automatic gear changing takes place. A practised driver wishing to try to reduce fuel consumption and also achieve greater comfort may then wish to help the system by imposing an upshift somewhat earlier than the safety margins would have allowed the automated gearbox to effect it.

If initiated at an unfortunate point in time, such an imposed gear change may risk causing the engine to stall. For example, the driver activating the mode selector at a time when the automated gearbox has just made a gear choice in automatic mode may result in the imposed manual gear change being added to the gear choice already made by the automated gearbox. An unwanted double gear change may then result from the combination of the automated gear choice and the imposed manual gear change, with consequent risk of the engine's speed becoming so low that it may stall.

According to the present invention, manual gear changes in automatic mode are barred, i.e. prevented, if the mode selector 120 is activated only a first time within a period of time during which an automatic gear change is effected, i.e. during a gear change period which comprises the time of making an automatic gear choice and the time during which the automatic gear change physically takes place. The gear change period thus comprises the time from when the gear change is initiated to when it is completed. Thus if the mode selector 120 is activated only once during that period, no manual gear change will be added to the automatic gear change, since manual gear changing is then barred by the system. Unwanted double gear changes are thus also prevented.

The present invention affords a number of advantages pertaining to implementation of the invention. The complexity of its implementation may be kept down to a low level, since it is only necessary to keep track of the number of activations of the mode selector during the gear change period. Prior art uses a number of timers to keep track of when various measures may or may not be adopted. Each of these timers has to be initiated, started and monitored for the previous known methods to work. According to the present invention, the barring and permitting of manual gear changes is implemented in such a way as to considerably reduce the complexity of the system. According to an embodiment of the present invention, the bar on manual gear changing is annulled if the mode selector is activated at least one second time during the gear change period, i.e. if the mode selector is activated a first time and thereafter at least one second time during the gear change period. Manual gear changing is thus allowed if the mode selector is activated at least twice during the gear change period.

This embodiment of the invention affords a number of advantages. It makes it possible, by repeated activations of the mode selector, to cause a manual gear change to take place when it is actually intended and is not effected by mistake. This procedure makes it possible for the driver to impose a double gear change if he/she really wants. He/she will thus have a feeling of being in full control of gear changing and also be able to appreciate the ability to positively affect fuel consumption and ride comfort. A double gear change being prevented upon first activation of the mode selector but allowed upon repeated activation is a very simple arrangement for the driver to learn and also provides a feeling of immediate effect unlike the prior art use of, for example, timers to prevent manual gear changing.

Figure 2:
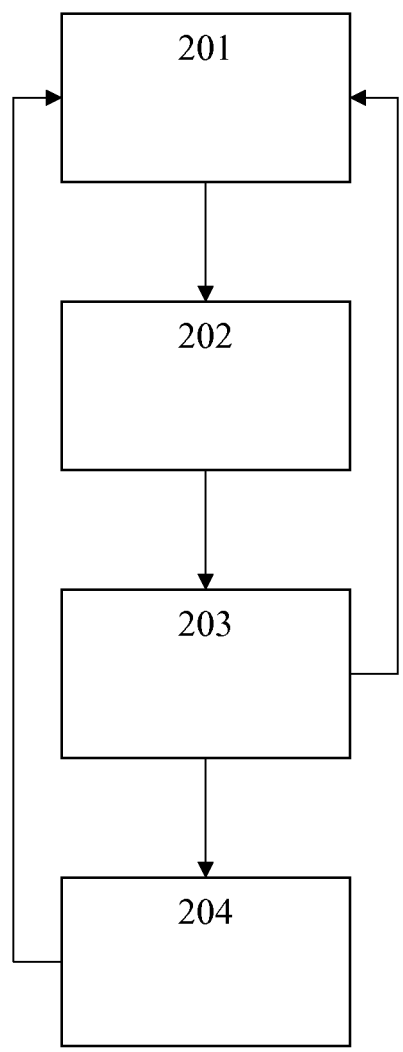
FIG. 2 is a schematic flowchart for a method according to the invention.

FIG. 2 depicts schematically the prevention (barring) of manual gear changing according to an embodiment of the method for the present invention. The method starts with step 201 in which the system is in automatic mode in a standby state in which no automatic gear change is proceeding and manual gear changing is permitted. The method moves on to step 202 when an automatic gear change commences, whereupon the system switches to a barring state in which any attempt at a manual gear change will be prevented.

At this stage, the control unit 110 is prepared to receive input signals from the input unit, e.g. from the mode selector 120. If the mode selector 120 is activated, a signal is sent to the control unit 110, which decides whether the signal received represents an activation of the mode selector 120. Thus at this stage the mode selector 120, if activated, generates a signal, a pulse or some other indication which the control unit 110 takes as meaning that the mode selector has been activated.

If the control unit receives a signal which represents a first activation of the mode selector, the method moves on to step 203, in which the system will be in a gear change state in which manual gear changing is allowed. The control unit continues to be prepared to receive signals from the mode selector 120. If one or more signals representing at least one second activation of the mode selector are received in this gear change state, the method moves on to step 204. The control unit 110 will also check whether an automatic gear change is actually proceeding at the time. If the automatic gear change is no longer proceeding, i.e. if it has been completed, the method goes back to step 201.

At step 204 the manual gear change is effected. When this has been done or the automatic gear change has ended, the method goes back to step 201.

According to an embodiment of the present invention, in FIG. 1, the manual gear change therefore takes a gear step if the mode selector 120 is activated a first time and thereafter a second time during the gear change period, resulting in a total of two gear steps comprising the automatic gear change and the manual gear change, if the automatic gear change takes the form of one gear step. The result is known as a double gear change.

According to an embodiment of the invention, the manual gear change effects a number N of gear steps if the mode selector is activated a first time and thereafter a further N second times during the gear change period. In other words, each time the mode selector 120 is activated after the first time during the gear change period, a further gear step will be taken in addition to the step or steps taken during the automatic gear change.

Certain motor vehicles are equipped with at least one output unit 130 in the form of, for example, a gear indicator in a driving cab. It will not usually display gears chosen during automatic gear changing in automatic mode, i.e. gears chosen by the output unit 130 during automatic gear changes will not be indicated. However, according to an embodiment of the present invention, the system comprises an output unit 130 in the form of a gear indicator in a driving cab, which indicator is connected to the control unit 110 and adapted to using information provided by the control unit as a basis for indicating a chosen gear if the mode selector has been activated at least a first time during the gear change period.

The result is that chosen gears will be displayed both if the mode selector is activated a first time only and if it is activated a first time and thereafter at least one further time. Gears chosen will therefore be indicated to the driver irrespective of whether his/her gear change is barred or is actually effected. What decides whether the display is presented or not is the actual activation of the mode selector and not whether the activation does or does not result in a manual gear change.

This embodiment of the invention affords an advantage in that it provides the driver with a feeling that the gear change was effected by him/her and hence that he/she actually controls and has control over the vehicle's gear changing.

Specialists will appreciate that a method for prevention of double gear changes according to the present invention might also be implemented in a computer program which, when executed in a computer, causes the computer to effect the method. The computer program is contained in a computer program product's computer-readable medium which takes the form of a suitable memory, e.g. ROM (read-only memory), PROM (programmable read-only memory), EPROM (erasable PROM), flash memory, EEPROM (electrically erasable PROM), hard disc unit, etc.

The present invention relates also to a system for prevention of unwanted double gear changes which comprises at least one control unit intended to control the gearbox and adapted to being able to effect a manual gear change during automatic mode if the mode selector is activated. The control unit is adapted to barring the manual gear change if the mode selector is only activated a first time during a gear change period, meaning the period of time during which an automatic gear change takes place in automatic mode.

According to an embodiment, the control unit is adapted, in the same way as described for the method above, to effecting the manual gear change if the mode selector is activated at least one second time during the gear change period, so that, for example, a double gear change takes place if the mode selector is activated a first time and thereafter a second time during the gear change period.

According to an embodiment, the system comprises a gear indicator in a driving cab, which indicator is connected to the control unit and indicates the chosen gear if the mode selector is activated at least a first time during the gear change period. The gear indicator takes the form of a display which shows graphically, for example, a numeral representing the chosen gear, or a display showing the chosen gear on a seven-segment display. The gear indicator is preferably so configured that the chosen gear appears alongside the gear being used at the time to move the vehicle forwards.

Figure 3:
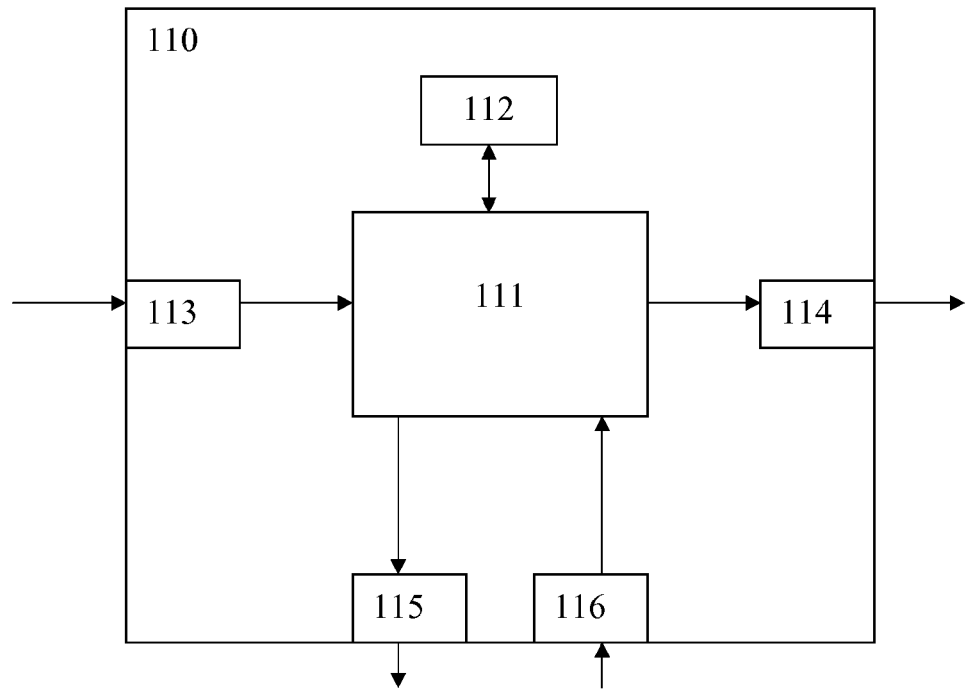
FIG. 3 depicts schematically a control unit.

FIG. 3 depicts schematically a control unit 110. The control unit 110 comprises a calculation unit 111 which may take the form of substantially any suitable type of processor or microcomputer, e.g. a circuit for digital signal processing (digital signal processor, DSP) or a circuit with a predetermined specific function (application specific integrated circuit, ASIC). The calculation unit 111 is connected to a memory unit 112 which is incorporated in the control unit 110 and which provides the calculation unit 111 with, for example, the stored program code and/or the stored data which the calculation unit 111 needs for it to be able to perform calculations. The calculation unit 111 is also adapted to storing partial or final results of calculations in the memory unit 112.

The control unit 110 is further provided with devices 113, 114, 115, 116 for respectively receiving input signals and sending output signals. These input and output signals may comprise waveforms, pulses or other attributes which the signal receiving devices 113, 116 can detect as information and which can be converted to signals which are processable by the calculation unit 111. The calculation unit 111 is then provided with these signals. The signal sending devices 114, 115 are adapted to converting signals received from the calculation unit 111 in order to create, eg by modulating the signals, output signals which may be transmitted to other parts of the system for prevention of double gear changes.

Each of the connections to the devices for respectively receiving input signals or sending output signals may take the form of one or more of the following: cable, data bus, e.g. CAN (controller area network) bus, MOST (media orientated systems transport) bus or some other bus configuration, or a wireless connection. The connections 70, 80, 90, 100 in FIG. 1 may also take the form of one or more of these cables, buses or wireless connections.

One skilled in the art will appreciate that the aforesaid computer may take the form of the calculation unit 111 and that the aforesaid memory may take the form of the memory unit 112.

Specialists will also appreciate that the above system may be modified according to the various embodiments of the method according to the invention. The invention relates also to a motor vehicle 1, e.g. a truck or bus, which comprises at least one system for determination of one or more shift points according to the invention.

The present invention is not limited to its embodiments described above, but relates to and comprises all embodiments within the scope of protection of the attached independent claims.

The invention claimed is:

1. A method for prevention of unwanted double gear changes for a gearbox in a motor vehicle, wherein the vehicle comprises an engine connected to drive the gearbox, the method comprising:
    the gearbox is configured and operable for effecting a manual gear change in an automatic mode if a mode selector connected to the gearbox is activated; and
    barring performance of the manual gear change by a control unit if the mode selector is only activated a first time during a gear change period, wherein the period represents a period of time during which an automatic gear change takes place in the automatic mode, and effecting the manual gear change if the mode selector is activated at least one second time during the gear change period.

2. A method according to claim 1, wherein the manual gear change effects a gear step if the mode selector is activated the first time and the second time during the gear change period, causing a double gear change.

3. A method according to claim 2, wherein the manual gear change effects a number N of gear steps if the mode selector is activated the first time and a further N second times during said gear change period.

4. A method according to claim 1, further comprising: barring performance of the manual gear change by performing the following steps via a control unit which is configured and operable to controlling the gearbox:
    setting a barring state which does not allow gear changing when the automatic gear change commences; and
    changing out of the barring state into a gear change state which allows manual gear changing if the mode selector is activated the first time; or
    changing out of the barring state into a standby state which allows manual gear changing if the gear change period has ended.

5. A method according to claim 1, further comprising indicating a chosen gear if the mode selector is activated at least the first time during the gear change period.

6. A method according to claim 1, wherein the gearbox is controlled by a control unit and is an automatic gearbox or an automated manual gearbox comprising a plurality of gears.

7. A computer program product comprising a non-transitory computer-readable medium and a computer program comprising program code contained in the computer-readable medium and which, when the program code is executed in a computer, causes the computer to effect the method according to claim 1, wherein the medium is within a category which comprises ROM (read-only memory), PROM (programmable ROM), EPROM (erasable PROM), flash memory, EEPROM (electrically erasable PROM) and hard disc unit.

8. A system for prevention of unwanted double gear changes for a gearbox, comprising: a gearbox in a motor vehicle and the vehicle comprises an engine connected, to drive the gearbox, the gearbox is also configured and operable effecting a manual gear change in an automatic mode when a mode selector connected to the gearbox is activated,
    a mode selector activated to control a gear change;
    at least one control unit controlling the gearbox; and
    the control unit is configured and operable for barring the manual gear change if the mode selector is only activated a first time during a gear change period, wherein the gear change period represents a period of time during which an automatic gear change takes place in the automatic mode, and the control unit effects the manual gear change if the mode selector is activated at least one second time during the gear change period.

9. A system according to claim 8, wherein the control unit causes the engine's gearbox to effect a gear step if the mode selector is activated for both the first time and the second time during the gear change period for causing a wanted double gear change.

10. A system according to claim 8, further comprising a gear indicator connected to the control unit, the gear indicator being configured and operable to using information provided by the control unit as a basis for indicating a chosen gear if the mode selector is activated at least the first time during the gear change period.

11. A system according to claim 10, wherein the gear indicator comprises any device within the category which comprises:
    a digital display adapted to showing a numeral; and
    a seven-segment display.

12. A motor vehicle comprising a system according to claim 8, wherein the vehicle is within a category which comprises:
    trucks and
    buses.

* * * * *